US012014387B1

United States Patent
Ramachandra et al.

(10) Patent No.: US 12,014,387 B1
(45) Date of Patent: Jun. 18, 2024

(54) SYSTEM, METHOD, AND COMPUTER PROGRAM FOR PROVIDING A PRICING PLATFORM FOR PERFORMING DIFFERENT TYPES OF PRICING CALCULATIONS FOR DIFFERENT CUSTOMERS

(71) Applicant: Apttus Corporation, San Mateo, CA (US)

(72) Inventors: Ramananda Gubbi Ramachandra, Burlingame, CA (US); Balu Jaidev Sreekumar, Fremont, CA (US); Koti R. Nandyala, Fremont, CA (US); Maulik Patel, Maharashtra (IN); Sriranga Srinivasa Reddy Meeniga, Fremont, CA (US)

(73) Assignee: Apttus Corporation, San Mateo, CA (US)

( * ) Notice: Subject to any disclaimer, the term of this patent is extended or adjusted under 35 U.S.C. 154(b) by 153 days.

(21) Appl. No.: 17/384,402

(22) Filed: Jul. 23, 2021

(51) Int. Cl.
*G06Q 10/0639* (2023.01)
*G06F 9/50* (2006.01)
(Continued)

(52) U.S. Cl.
CPC ....... *G06Q 30/0206* (2013.01); *G06F 9/5061* (2013.01); *G06Q 10/04* (2013.01); *G06Q 10/0639* (2013.01); *G06Q 30/0633* (2013.01)

(58) Field of Classification Search
None
See application file for complete search history.

(56) References Cited

U.S. PATENT DOCUMENTS 5,960,407 A 9/1999 Vivona
6,473,084 B1 10/2002 Phillips et al.
(Continued)

FOREIGN PATENT DOCUMENTS

CA 2742395 1/2019
CN 1315705 3/2001
(Continued)

OTHER PUBLICATIONS

Alicia "Developing Product Configurators for Use in a Multinational Industrial Goods Company", May 2013, MIT, pp. 1-87 (Year: 2013).*

(Continued)

Primary Examiner — Romain Jeanty
(74) Attorney, Agent, or Firm — Lessani Law Group, PC

(57) ABSTRACT

The present disclosure relates to a system, method, and computer program for providing a pricing platform for performing pricing calculations for a plurality of different customers with different types of pricing calculations. An instance of the price-calculation pipeline is created for each of a plurality of customers of the pricing platform. The instances of the price-calculation pipeline are executed to perform pricing calculations for a plurality of different customers with different types of pricing calculations. For each instance of the price-calculation pipeline, a performance metric is generated for each of the modular pricing stages within the instance. The performance metrics are displayed in a user dashboard that provides user controls that enable the user to adjust the computational resources allocated to each of the modular pricing stages executing on the platform. The computational resources allocated to one or more modular pricing stages are adjusted in accordance with received user input.

18 Claims, 3 Drawing Sheets

(51) Int. Cl.
  *G06Q 10/04* (2023.01)
  *G06Q 30/0201* (2023.01)
  *G06Q 30/0601* (2023.01)

(56) References Cited

U.S. PATENT DOCUMENTS

| | | | |
|---|---|---|---|
| 7,328,177 | B1 | 2/2008 | Lin-Hendel |
| 7,574,381 | B1 | 8/2009 | Lin-Hendel |
| 7,693,762 | B1* | 4/2010 | Dagum ............... G06Q 30/06 705/35 |
| 7,725,358 | B1 | 5/2010 | Brown et al. |
| 8,498,954 | B2 | 7/2013 | Malov et al. |
| 8,644,842 | B2 | 2/2014 | Arrasvuori et al. |
| 9,495,222 | B1* | 11/2016 | Jackson ............... G06F 11/3433 |
| 9,519,907 | B2 | 12/2016 | Carter, III et al. |
| 10,289,261 | B2 | 5/2019 | Aggarwal et al. |
| 10,521,491 | B2 | 12/2019 | Krappe et al. |
| 10,621,640 | B2 | 4/2020 | Krappe et al. |
| 10,783,575 | B1 | 9/2020 | Krappe et al. |
| 11,232,508 | B2 | 1/2022 | Krappe |
| 11,455,373 | B2 | 9/2022 | Krappe et al. |
| 11,550,786 | B1 | 1/2023 | Naganathan et al. |
| 11,604,799 | B1 | 3/2023 | Bigdelu et al. |
| 11,615,080 | B1 | 3/2023 | Naganathan et al. |
| 11,615,089 | B1 | 3/2023 | Naganathan et al. |
| 11,720,951 | B2 | 8/2023 | Krappe |
| 2002/0040332 | A1 | 4/2002 | Maari et al. |
| 2003/0033240 | A1 | 2/2003 | Balson et al. |
| 2004/0158560 | A1 | 8/2004 | Wen et al. |
| 2006/0100912 | A1 | 5/2006 | Kumar et al. |
| 2006/0136470 | A1 | 6/2006 | Dettinger et al. |
| 2007/0016536 | A1 | 1/2007 | Mirlas et al. |
| 2007/0039209 | A1 | 2/2007 | White et al. |
| 2007/0087756 | A1 | 4/2007 | Hoffberg |
| 2007/0162373 | A1 | 7/2007 | Kongtcheu |
| 2007/0294157 | A1* | 12/2007 | Singla ............... G06Q 40/04 705/36 R |
| 2008/0046355 | A1 | 2/2008 | Lo |
| 2008/0091551 | A1 | 4/2008 | Olheiser et al. |
| 2008/0177717 | A1 | 7/2008 | Kumar et al. |
| 2009/0024613 | A1 | 1/2009 | Niu et al. |
| 2009/0048937 | A1 | 2/2009 | Contreras et al. |
| 2009/0222319 | A1 | 9/2009 | Cao et al. |
| 2009/0234710 | A1 | 9/2009 | Belgaied Hassine et al. |
| 2009/0299974 | A1 | 12/2009 | Kataoka et al. |
| 2009/0327166 | A1 | 12/2009 | Carter, III et al. |
| 2010/0179859 | A1 | 7/2010 | Davis et al. |
| 2010/0262478 | A1 | 10/2010 | Bamborough et al. |
| 2010/0306120 | A1 | 12/2010 | Ciptawilangga |
| 2011/0246136 | A1 | 10/2011 | Haratsch et al. |
| 2011/0246434 | A1 | 10/2011 | Cheenath et al. |
| 2012/0173384 | A1 | 7/2012 | Herrmann et al. |
| 2012/0221410 | A1 | 8/2012 | Bennett et al. |
| 2012/0246035 | A1 | 9/2012 | Cross et al. |
| 2012/0254092 | A1 | 10/2012 | Malov et al. |
| 2012/0259801 | A1 | 10/2012 | Ji et al. |
| 2013/0103391 | A1 | 4/2013 | Millmore et al. |
| 2013/0132273 | A1 | 5/2013 | Stiege et al. |
| 2013/0304757 | A1 | 11/2013 | Gebhard et al. |
| 2014/0025529 | A1 | 1/2014 | Honeycutt et al. |
| 2014/0040275 | A1 | 2/2014 | Dang et al. |
| 2014/0136443 | A1 | 5/2014 | Kinsey, II et al. |
| 2014/0149273 | A1 | 5/2014 | Angell et al. |
| 2014/0379755 | A1 | 12/2014 | Kuriakose et al. |
| 2015/0120526 | A1 | 4/2015 | Peterffy et al. |
| 2015/0142704 | A1 | 5/2015 | London |
| 2015/0309705 | A1 | 10/2015 | Keeler et al. |
| 2015/0310005 | A1 | 10/2015 | Ryger et al. |
| 2015/0310114 | A1 | 10/2015 | Ryger et al. |
| 2015/0310115 | A1 | 10/2015 | Ryger et al. |
| 2015/0348551 | A1 | 12/2015 | Gruber et al. |
| 2015/0378156 | A1 | 12/2015 | Kuehne |
| 2016/0034923 | A1 | 2/2016 | Majumdar et al. |
| 2017/0004588 | A1 | 1/2017 | Isaacson et al. |
| 2017/0068670 | A1 | 3/2017 | Orr et al. |
| 2017/0124176 | A1 | 5/2017 | Beznos et al. |
| 2017/0124655 | A1 | 5/2017 | Crabtree et al. |
| 2017/0235732 | A1 | 8/2017 | Williams et al. |
| 2017/0243107 | A1 | 8/2017 | Jolley et al. |
| 2017/0351241 | A1 | 12/2017 | Bowers et al. |
| 2017/0358024 | A1 | 12/2017 | Mattingly et al. |
| 2018/0005208 | A1 | 1/2018 | Aggarwal et al. |
| 2018/0096406 | A1 | 4/2018 | Krappe et al. |
| 2018/0218032 | A1 | 8/2018 | Wong et al. |
| 2018/0285595 | A1 | 10/2018 | Jessen |
| 2018/0293640 | A1 | 10/2018 | Krappe |
| 2018/0336247 | A1 | 11/2018 | Ignatyev et al. |
| 2018/0349324 | A1 | 12/2018 | Krappe et al. |
| 2018/0349377 | A1 | 12/2018 | Verma et al. |
| 2019/0258632 | A1 | 8/2019 | Pal et al. |
| 2019/0370388 | A1 | 12/2019 | Li et al. |
| 2020/0057946 | A1 | 2/2020 | Singaraju et al. |
| 2020/0065354 | A1 | 2/2020 | Krappe et al. |
| 2020/0334241 | A1 | 10/2020 | Muralidhar et al. |
| 2021/0064483 | A1 | 3/2021 | Paramasivam et al. |
| 2021/0089587 | A1 | 3/2021 | Gupta et al. |
| 2021/0090575 | A1 | 3/2021 | Mahmood et al. |
| 2021/0107141 | A1 | 4/2021 | Shrivastava et al. |
| 2021/0241301 | A1* | 8/2021 | Christensen ....... G06Q 30/0603 |
| 2022/0148071 | A1 | 5/2022 | Krappe |
| 2022/0318223 | A1 | 10/2022 | Ahluwalia et al. |

FOREIGN PATENT DOCUMENTS

| | | | |
|---|---|---|---|
| CN | 106910091 | 6/2017 | |
| EP | 2650776 | 10/2013 | |
| EP | 3073421 | 9/2016 | |
| JP | 2001290977 | 10/2001 | |
| JP | 2017146909 | 8/2017 | |
| WO | 0052605 | 9/2000 | |
| WO | 03003146 | 1/2003 | |
| WO | WO-2005006122 A2 * | 1/2005 | ......... G06Q 30/0278 |
| WO | 2015106353 | 7/2015 | |

OTHER PUBLICATIONS

Torsten "Controlling instruments' for price management: a single case study on a B2B company in the OEM business operating in the German electrical/electronics industry", Sep. 2018, A thesis submitted to The University of Gloucestershire, pp. 1-339 (Year: 2018).*
Oracle: Automating the Quote-to-Cash Process: An Oracle White Paper, Jun. 2009, pp. 1-19.
McCormick, M., "What is Quote to Cash?" Blog, BlackCurve, Jan. 20, 2016, pp. 1-8.
Microsoft/APTTUS: Ultimate Guide to Quote-To-Cash for Microsoft Customers, Web Archives, Oct. 1, 2015, pp. 1-28.
Morelli et al., "IBM SPSS Predictive Analytics: Optimizing Decisions at the point of impact", 2010, pp. 1-59.
Riggins, J., "Interview Quote-to-Cash Pioneers Apttus Links Leads to Revenue", May 21, 2014, pp. 1-7.
Spedicato, G., et al., Machine Learning Methods to Perform Pricing Optimization. A Comparison with Standard GLMs, Dec. 2018, pp. 1-21.
Wainewright, Phil, "Salesforce, Microsoft quote-to-cash partner Apttus raises $88m", Sep. 29, 2016, pp. 1-7.
Wainewright, Phil, Apttus Applies Azure Machine Learning to Quote-to-Cash, Apr. 3, 2016, pp. 1-5.
Wireless News: Banglalink Keeps Mobile Subscribers Using Predictive Analytics with KXEN, Close-Up Media, Inc., Oct. 5, 2013, pp. 1-2.
Xie, Qitao et al., "Chatbot Application on Cryptocurrency", 2019 IEEE Conference on Computational Intelligence for Financial Engineering & Economics, 2019, pp. 1-8.

* cited by examiner

SYSTEM, METHOD, AND COMPUTER PROGRAM FOR PROVIDING A PRICING PLATFORM FOR PERFORMING DIFFERENT TYPES OF PRICING CALCULATIONS FOR DIFFERENT CUSTOMERS

BACKGROUND OF THE INVENTION

1. Field of the Invention

This invention relates generally to pricing platforms, and more specifically to a system and method for providing a pricing platform for performing pricing calculations for a plurality of different customers with different types of pricing calculations.

2. Description of the Background Art

A platform-based service allows developers and customers to create, host, and deploy applications without having to set up and maintain the infrastructure for such, with the added benefit of being able to adjust scalability. One type of application that is essential to many customers' businesses is pricing applications. Unfortunately, because such a pricing platform would be used for different customers with different pricing calculation needs, it is hard to build one big monolith system that is tailored to and optimized for every customer. For example, some customers perform certain types of calculations and may need more processing power in certain areas, whereas other customers may need more processing power in other areas. As it would be difficult to build one application that is optimized for everyone, there is a need for a modular system so that an administrator or machine-learning system can customize how the resources are allocated to different stages.

One of the disadvantages, however, with typical modular services, such as microservices, is that there are often overhead delays between the microservices communication. Therefore, there is a need for a way to minimize the delays while being able to provide optimization to the pricing platform. This is solved in the present application by making sure that for each instance of the pricing pipeline, all modular stages operate within the same process boundary so that there are minimal delays in communication between stages.

SUMMARY OF THE DISCLOSURE

The present disclosure describes a system, method, and computer program for providing a pricing platform for performing pricing calculations for a plurality of different customers with different types of pricing calculations. The method is performed by a computer system that includes servers, storage systems, networks, operating systems, and databases.

The invention is a system and method for providing a pricing platform for performing pricing calculations for different customers having different pricing calculation needs. Despite the customer variance, the system is able to provide a pricing platform that is tailored to and optimized for each particular customer's pricing calculation needs. It does this by creating an instance of the price-calculation pipeline for each of the customers of the pricing platform, where the price-calculation pipeline has a plurality of modular pricing stages. It then executes each instance of the price-calculation pipeline and generates a performance metric for each modular pricing stage within each instance of the price-calculation pipeline. The system then displays the performance metrics to the user (e.g., an administrator) and enables the user to adjust the computational resources allocated to each of the modular pricing stages within an instance of the pipeline. In addition to enabling each customer to optimize the pricing platform despite the customers having different pricing calculation needs, the system groups the modular pricing stages within a single instance to be executed within the same process boundary to reduce communication delays and thereby increase efficiency of the system.

In one embodiment, a method for providing a pricing platform for performing pricing calculations for a plurality of different customers with different types of pricing calculations, where the pricing platform has a price-calculation pipeline with multiple stages, comprises the following steps:

creating an instance of the price-calculation pipeline for each of a plurality of customers of the pricing platform, wherein the price-calculation pipeline has a plurality of modular pricing stages for performing pricing calculations;

executing the instances of the price-calculation pipeline to perform pricing calculations for a plurality of different customers with different types of pricing calculations, wherein:
inputs to the instances of the price-calculation pipeline are cart data and outputs of the instances of the price-calculation pipeline are price calculations,
the modular pricing stages within a single instance of the price-calculation pipeline are executed within the same process boundary, and
the computational resources allocated to each modular pricing stage within an instance of the price-calculation pipeline are independently configurable;

for each instance of the price-calculation pipeline, generating a performance metric for each of the modular pricing stages within the instance;

displaying the performance metrics in a user dashboard and providing user controls that enable the user to adjust the computational resources allocated to each of the modular pricing stages executing on the platform, wherein the allocation of computational resources to the modular pricing stages is independently configurable for each customer and for each instance of the price-calculation pipeline;

receiving user input to make one or more adjustments to the computational resources allocated to the modular pricing stages; and adjusting the computational resources allocated to one or more modular pricing stages in accordance with the user input.

DETAILED DESCRIPTION OF THE PREFERRED EMBODIMENTS

The present disclosure describes a system, method, and computer program for providing a pricing platform for performing pricing calculations for a plurality of different customers with different types of pricing calculations, where the pricing platform has a price-calculation pipeline with multiple stages. The method is performed by a computer system that includes servers, storage systems, networks, operating systems, and databases ("the system").

A system and method for providing a pricing platform for performing pricing calculations for a plurality of different customers with different types of pricing calculations is provided, where the pricing platform has a price-calculation pipeline with multiple stages. The system creates an instance of the price-calculation pipeline for each of a plurality of customers of the pricing platform. The price-calculation pipeline has a plurality of modular pricing stages for performing pricing calculations. The system executes the instances of the price-calculation pipeline to perform pricing calculations for a plurality of different customers with different types of pricing calculations. For each instance of the price-calculation pipeline, the system generates a performance metric for each of the modular pricing stages within the instance. The system displays the performance metrics in a user dashboard and provides user controls that enable the user (e.g., an administrator) to adjust the computational resources allocated to each of the modular pricing stages executing on the platform, where the allocation of computational resources to the modular pricing stages is independently configurable for each customer and for each instance of the price-calculation pipeline. The system receives user input to make one or more adjustments to the computational resources allocated to the modular pricing stages. The system then adjusts the computational resources allocated to one or more modular pricing stages in accordance with the user input.

Figure 1:
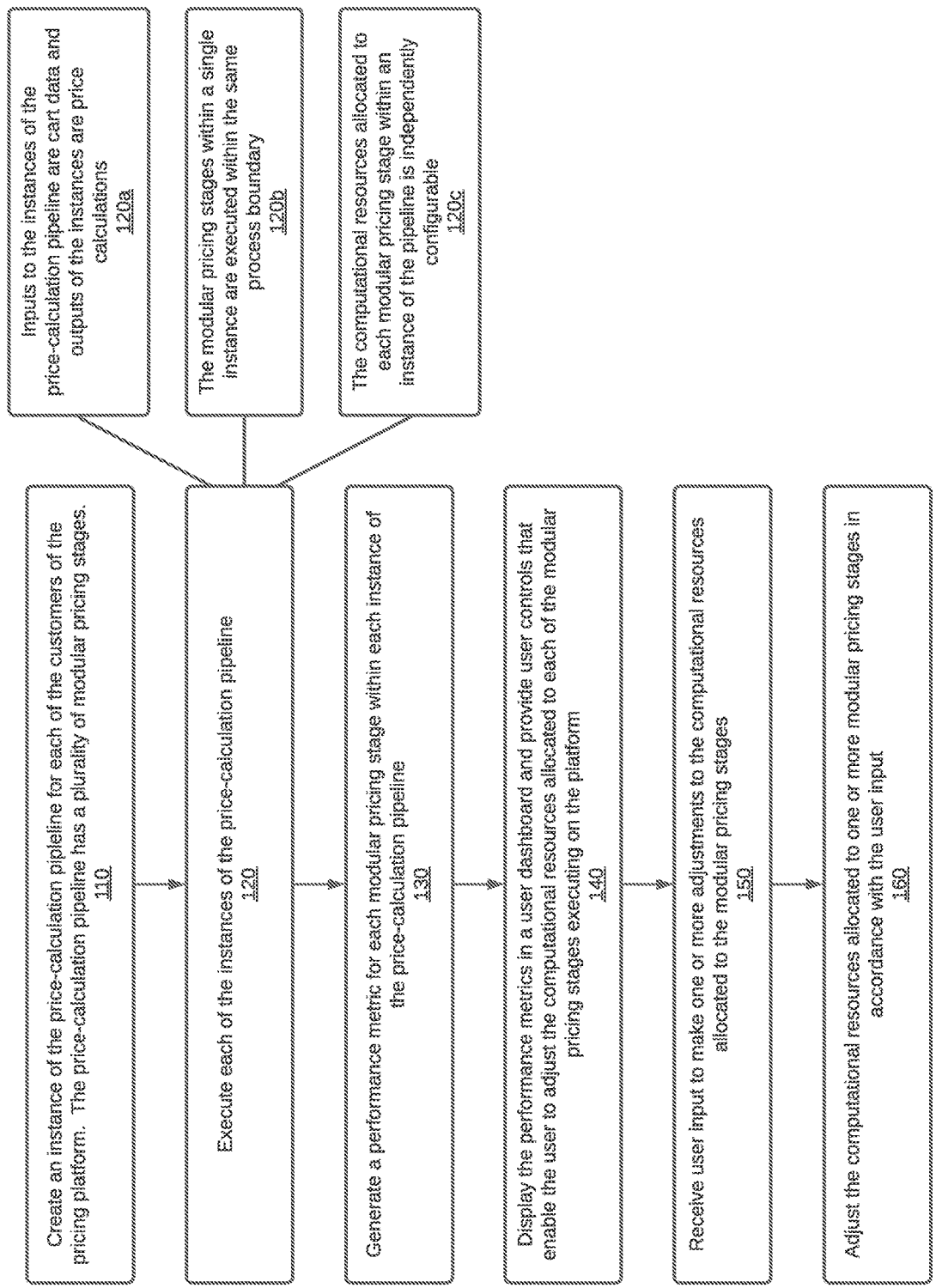
FIG. 1 is a flowchart that illustrate a method, according to one embodiment, for providing a pricing platform for performing pricing calculations for a plurality of different customers with different types of pricing calculations.
Figure 2:
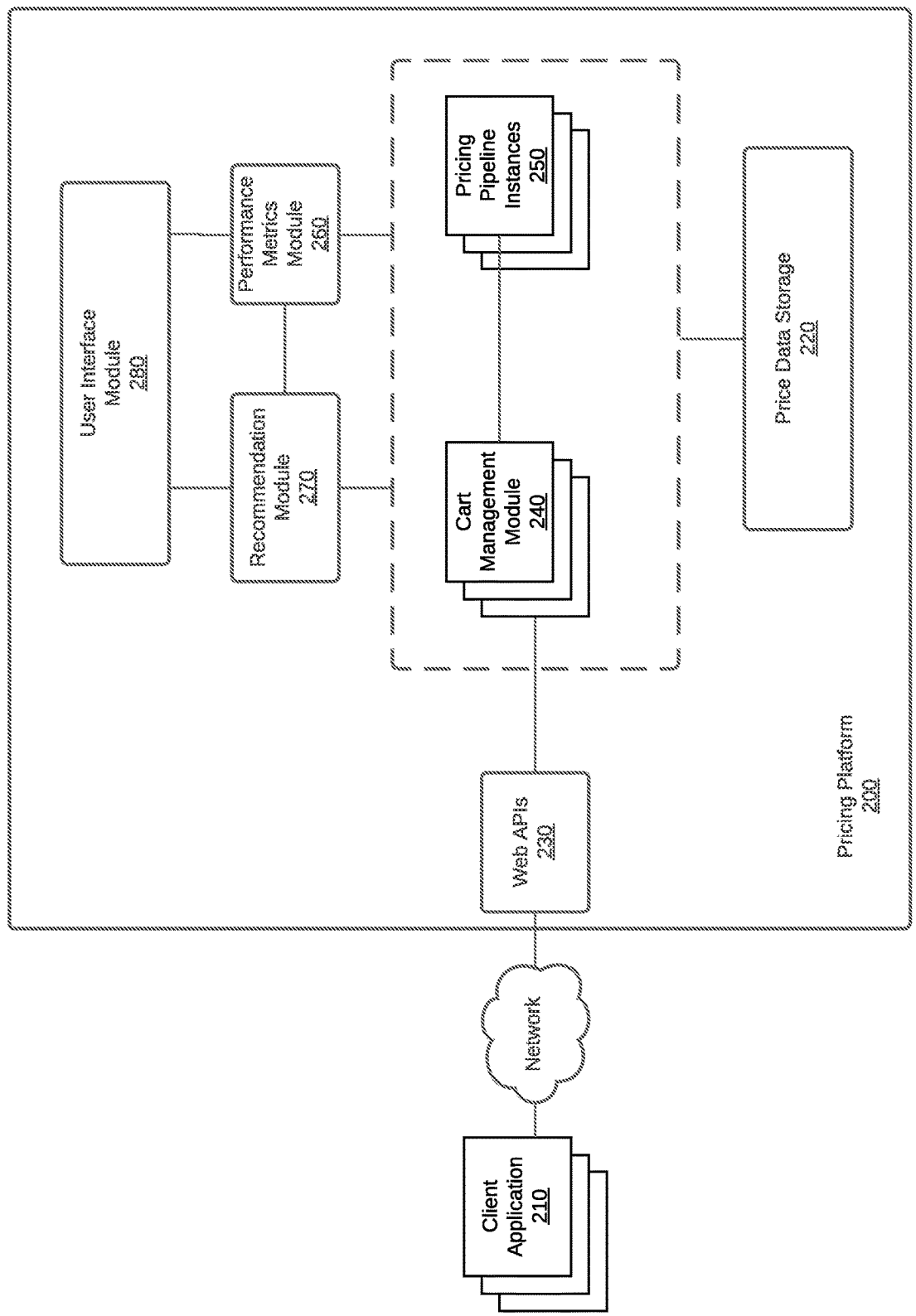
FIG. 2 is a block diagram that illustrates an example software architecture according to one embodiment.
Figure 3:
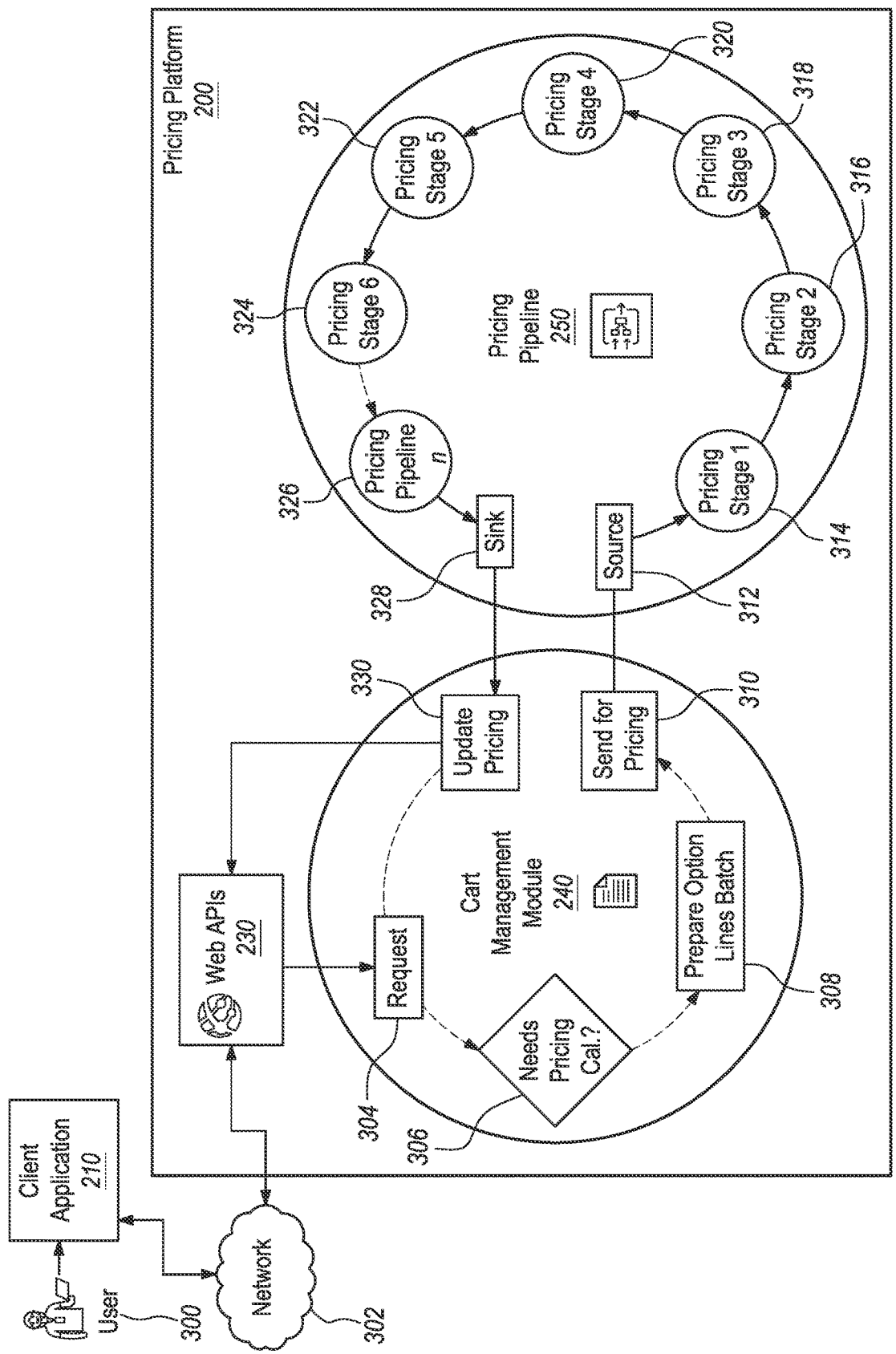
FIG. 3 is a block diagram that illustrates an example of one instance of the pricing pipeline for one client application according to the embodiment illustrated in FIG. 2.

Example implementations of the method are described in more detail with respect to FIGS. 1-3.

1. Method for Providing a Pricing Platform for Performing Different Types of Pricing Calculations for Different Customers FIG. 1 illustrates a method for providing a pricing platform for performing pricing calculations for a plurality of different customers with different types of pricing calculations, where the pricing platform has a price-calculation pipeline with multiple stages. The system creates an instance of the price-calculation pipeline for each of the customers of the pricing platform, where the price-calculation pipeline has a plurality of modular pricing stages (step 110).

Modular pricing stages are specific steps in a pricing operation and are executed as separate software modules. Examples of modular pricing stages include matching products, matching attributes, applying rules, applying promotions, price matrix, price list item, price escalator, quantity and selling term, pricing callback or pricing extension, approval check, deal guidance check, etc. A person skilled in the art would understand that the modular pricing stages may include other examples not listed above within the scope of the present invention. Within an instance, all the modular pricing stages are executed within the same process boundary and on the same machine, and they share the same memory address space.

The system executes each of the instances of the price-calculation pipeline (step 120). The amount of computation performed at each modular pricing stage varies among the instances of the pricing pipeline due to the different types of pricing calculations of the different customers. Inputs to the instances of the price-calculation pipeline are cart data and outputs of the instances are price calculations (step 120a). In certain embodiments, if the cart data is large, the cart data will be divided into batches. Each batch will be assigned to an instance of the pricing pipeline, and the plurality of instances may run in parallel. A customer may have one or more instances of the pricing pipeline, depending on the pricing calculation requirements of the customer. The modular pricing stages within a single instance are executed within the same process boundary (step 120b). Different instances may run on different machines and, therefore, in different process boundaries. The computational resources allocated to each modular pricing stage within an instance of the pricing pipeline are independently configurable (step 120c).

The system generates a performance metric for each modular pricing stage within each instance of the price-calculation pipeline (step 130). The performance metric indicates how long it takes for each of the modular pricing stages to run a batch, and when the performance metrics are aggregated, it provides the overall throughput of the pipeline. The system displays the performance metrics in a user dashboard and provides user controls that enable the user to adjust the computational resources allocated to each of the modular pricing stages executing on the pricing platform (step 140). The amount of computational resources allocated to a particular modular pricing stage varies across instances. For example, the amount of computational resources allocated to pricing stage 3 in instance X may be different than the computational resources allocated to pricing stage 3 in instance Y.

The system receives user input to make one or more adjustments to the computational resources allocated to the modular pricing stages (step 150). The system adjusts the computational resources allocated to one or more modular pricing stages in accordance with the user input (step 160).

In certain embodiments, allocating more resources means to add more resources to modular pricing stages that are slower in order to balance the load. Examples of computational resources include memory (e.g., RAM), processing power (e.g., CPU), PODS (i.e., horizontal scaling or an increase in copies), etc. In certain embodiments, an administrator manually adjusts the computational resources. In certain embodiments, the system can adjust the computational resources automatically by means of a machine-learning system that uses the historical recommendations and the corresponding approval or rejections of the user. For each instance of the price-calculation pipeline, certain modular pricing stages may be mandatory and certain modular pricing stages may be optional and, therefore, a pass through. In other words, for the modular pricing stages that are optional, the user may choose to lower the allocation to the modular pricing stage such that its impact is negligible.

In certain embodiments, adjusting the computational resources allocated to a modular pricing stage comprises increasing or decreasing the computational resources assigned to the modular pricing stage. In certain embodiments, the system recommends to the user one or more adjustments to the modular pricing stages in order to optimize throughput of the instances of the pricing pipeline. In certain embodiments, receiving user input and making adjustments includes receiving the user feedback on the recommendations and making any recommended adjustments to the modular pricing stages that were approved by the user. In certain embodiments, the user may adjust how long the cart data is stored and how much of the cart data is stored. For example, the cart data may be stored short term (e.g., one to two months, two weeks, etc.), but the price master data may be stored long term (e.g., indefinitely). In certain embodiments, the cart data is divided into batches, the batches of cart data are run in parallel using multiple instances of the pricing pipeline, and the batches are combined before updating the price.

2. Example System Architecture

FIG. 2 illustrates an example architecture for a pricing platform 200 that performs the methods described herein. However, the methods described herein may be implemented in other systems and are not limited to the illustrated pricing platform 200. A plurality of client applications 210 associated with different customers having different pricing calculation needs sends data over a network to the web APIs 230 of the pricing platform 200. The web APIs 230 supply the data to a plurality of cart management modules 240, where each cart management module 240 manages the cart data for one of the client applications 210 (i.e., keeps track of cart contents and responds to the actions of the end user, such as a sales representative, on the cart). An instance of the pricing pipeline 250 is created for each client application 210, and the cart management module 240 provides the cart data to the corresponding instance of the pricing pipeline 250. Within each instance of the pricing pipeline 250, a plurality of modular pricing stages is executed on the pricing platform 200.

The performance metrics module 260 monitors the execution of the modular pricing stages and generates a performance metric for each modular pricing stage within each instance of the pricing pipeline 250. It provides the performance metrics both to a recommendation module 270, which provides recommendations on how to adjust the computational resources allocated to each of the modular pricing stages, as well as to the user interface module 280, which displays the performance metrics and provides user controls that enable the user to adjust the computational resources allocated to each of the modular pricing stages executing on the pricing platform 200.

3. Example of One Instance of a Pricing Pipeline

FIG. 3 is a block diagram that illustrates an example of one instance of the pricing pipeline for one client application according to the embodiment illustrated in FIG. 2. However, as noted above, the methods described herein may be implemented in other systems and are not limited to the illustrated pricing platform 200. In FIG. 3, one customer of the pricing platform 200, i.e., user 300, enters data into one of the client applications 210. The data is transmitted over a network 302 to the web APIs 230 of the pricing platform 200. The cart management module 240 receives the data as a request 304. In certain embodiments, multiple requests can be executed at the same time. It then determines whether there is a need for a pricing calculation 306. It prepares option lines for the batch 308. In certain embodiments, if the cart data is large, the cart data will be divided into batches. Each batch will be assigned to instances of the pricing pipeline 250 that may be run in parallel. Then it sends for the pricing calculation 310 from the instance(s) of the pricing pipeline 250.

The pricing pipeline 250 receives the cart data from the cart management module 240, which is denoted as the source 312. The pricing pipeline 250 then processes the cart data in the first modular pricing stage (i.e., pricing stage 1 314). Subsequent to the first modular pricing stage are n modular pricing stages. These are denoted in FIG. 3 as pricing stage 2 316, pricing stage 3 318, pricing stage 4 320, pricing stage 5 322, pricing stage 6 324, and pricing stage n 326. A person skilled in the art would understand that there can be more or less modular pricing stages within the scope of the present invention. As noted previously, the outputs of the instances of the price-calculation pipeline are price calculations, which are denoted as the sink 328.

The price calculations, which are the result of the modular pricing stages, update the pricing 330 in the cart management module 240. If the cart data was divided into multiple batches, the instances of the pricing pipeline 250 will be combined before updating the price. The updated pricing is then sent to the web APIs 230, which transmit it through the network 302 to the client application 210. As noted previously, the system monitors the execution of the modular pricing stages 314-326 and generates a performance metric for each modular pricing stage 314-326 within an instance of the pricing pipeline 250. The system displays the performance metrics in a user interface module and provides user controls that enable the user to adjust the computational resources allocated to each of the modular pricing stages 314-326 executing on the pricing platform 200.

4. General

The methods described with respect to FIGS. 1-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for providing a pricing platform for performing pricing calculations for a plurality of different customers with different types of pricing calculations, wherein the pricing platform has a price-calculation pipeline with multiple stages, the method comprising:

creating an instance of the price-calculation pipeline for each of a plurality of customers of the pricing platform, wherein the price-calculation pipeline has a plurality of modular pricing stages for performing pricing calculations;

executing the instances of the price-calculation pipeline to perform pricing calculations for a plurality of different customers with different types of pricing calculations, wherein:
inputs to the instances of the price-calculation pipeline are cart data and outputs of the instances of the price-calculation pipeline are price calculations,
the modular pricing stages within a single instance of the price-calculation pipeline are executed within the same process boundary, and
the computational resources allocated to each modular pricing stage within an instance of the price-calculation pipeline are independently configurable;

for each instance of the price-calculation pipeline, generating a performance metric for each of the modular pricing stages within the instance;

displaying the performance metrics in a user dashboard executed by a computer server and providing user controls that enable the user to adjust the computational resources allocated to each of the modular pricing stages executing on the platform, wherein the allocation of computational resources to the modular pricing stages is independently configurable for each customer and for each instance of the price-calculation pipeline;

receiving user input to make one or more adjustments to the computational resources allocated to the modular pricing stages; and adjusting the computational resources allocated to one or more modular pricing stages in accordance with the user input, wherein, for at least one modular pricing stage executing on the platform, automatically adjusting the computational resources allocated by means of a machine-learning system that uses historical recommendations and corresponding approvals or rejections of the user.

2. The method of claim 1, wherein adjusting the computational resources allocated to a modular pricing stage comprises increasing or decreasing the computational resources assigned to the modular pricing stage.

3. The method of claim 1, further comprising:
recommending to the user one or more adjustments to the modular pricing stages in order to optimize throughput of the instances of the pricing pipeline.

4. The method of claim 3, wherein receiving user input and making adjustments include:
receiving the user feedback on the recommendations; and
making any recommended adjustments to the modular pricing stages that were approved by the user.

5. The method of claim 1, wherein the user adjusts how long the cart data is stored and how much of the cart data is stored.

6. The method of claim 1, wherein the cart data is divided into batches, the batches of cart data are run in parallel using multiple instances of the pricing pipeline, and the batches are combined before updating the price.

7. A non-transitory computer-readable medium comprising a computer program, that, when executed by a computer system, enables the computer system to perform the following method for providing a pricing platform for performing pricing calculations for a plurality of different customers with different types of pricing calculations, wherein the pricing platform has a price-calculation pipeline with multiple stages, the steps comprising:
creating an instance of the price-calculation pipeline for each of a plurality of customers of the pricing platform, wherein the price-calculation pipeline has a plurality of modular pricing stages for performing pricing calculations;
executing the instances of the price-calculation pipeline to perform pricing calculations for a plurality of different customers with different types of pricing calculations, wherein:
inputs to the instances of the price-calculation pipeline are cart data and outputs of the instances of the price-calculation pipeline are price calculations,
the modular pricing stages within a single instance of the price-calculation pipeline are executed within the same process boundary, and
the computational resources allocated to each modular pricing stage within an instance of the price-calculation pipeline are independently configurable;
for each instance of the price-calculation pipeline, generating a performance metric for each of the modular pricing stages within the instance;
displaying the performance metrics in a user dashboard executed by a computer server and providing user controls that enable the user to adjust the computational resources allocated to each of the modular pricing stages executing on the platform, wherein the allocation of computational resources to the modular pricing stages is independently configurable for each customer and for each instance of the price-calculation pipeline;
receiving user input to make one or more adjustments to the computational resources allocated to the modular pricing stages; and
adjusting the computational resources allocated to one or more modular pricing stages in accordance with the user input, wherein, for at least one modular pricing stage executing on the platform, automatically adjusting the computational resources allocated by means of a machine-learning system that uses historical recommendations and corresponding approvals or rejections of the user.

8. The computer-readable medium of claim 7, wherein adjusting the computational resources allocated to a modular pricing stage comprises increasing or decreasing the computational resources assigned to the modular pricing stage.

9. The computer-readable medium of claim 7, further comprising:
recommending to the user one or more adjustments to the modular pricing stages in order to optimize throughput of the instances of the pricing pipeline.

10. The computer-readable medium of claim 9, wherein receiving user input and making adjustments include:
receiving the user feedback on the recommendations; and
making any recommended adjustments to the modular pricing stages that were approved by the user.

11. The computer-readable medium of claim 7, wherein the user adjusts how long the cart data is stored and how much of the cart data is stored.

12. The computer-readable medium of claim 7, wherein the cart data is divided into batches, the batches of cart data are run in parallel using multiple instances of the pricing pipeline, and the batches are combined before updating the price.

13. A computer system for providing a pricing platform for performing pricing calculations for a plurality of different customers with different types of pricing calculations, wherein the pricing platform has a price-calculation pipeline with multiple stages, the system comprising:
one or more processors;
one or more memory units coupled to the one or more processors, wherein the one or more memory units store instructions that, when executed by the one or more processors, cause the system to perform the operations of:
creating an instance of the price-calculation pipeline for each of a plurality of customers of the pricing platform, wherein the price-calculation pipeline has a plurality of modular pricing stages for performing pricing calculations;
executing the instances of the price-calculation pipeline to perform pricing calculations for a plurality of different customers with different types of pricing calculations, wherein:
inputs to the instances of the price-calculation pipeline are cart data and outputs of the instances of the price-calculation pipeline are price calculations,
the modular pricing stages within a single instance of the price-calculation pipeline are executed within the same process boundary, and
the computational resources allocated to each modular pricing stage within an instance of the price-calculation pipeline are independently configurable;

for each instance of the price-calculation pipeline, generating a performance metric for each of the modular pricing stages within the instance;
displaying the performance metrics in a user dashboard executed by a computer server and providing user controls that enable the user to adjust the computational resources allocated to each of the modular pricing stages executing on the platform, wherein the allocation of computational resources to the modular pricing stages is independently configurable for each customer and for each instance of the price-calculation pipeline;
receiving user input to make one or more adjustments to the computational resources allocated to the modular pricing stages; and
adjusting the computational resources allocated to one or more modular pricing stages in accordance with the user input, wherein, for at least one modular pricing stage executing on the platform, automatically adjusting the computational resources allocated by means of a machine-learning system that uses historical recommendations and corresponding approvals or rejections of the user.

14. The computer system of claim 13, wherein adjusting the computational resources allocated to a modular pricing stage comprises increasing or decreasing the computational resources assigned to the modular pricing stage.

15. The computer system of claim 13, further comprising:
recommending to the user one or more adjustments to the modular pricing stages in order to optimize throughput of the instances of the pricing pipeline.

16. The computer system of claim 15, wherein receiving user input and making adjustments include:
receiving the user feedback on the recommendations; and
making any recommended adjustments to the modular pricing stages that were approved by the user.

17. The computer system of claim 13, wherein the user adjusts how long the cart data is stored and how much of the cart data is stored.

18. The computer system of claim 13, wherein the cart data is divided into batches, the batches of cart data are run in parallel using multiple instances of the pricing pipeline, and the batches are combined before updating the price.

\* \* \* \* \*